(12) United States Patent
Henrici et al.

(10) Patent No.: US 11,435,071 B1
(45) Date of Patent: Sep. 6, 2022

(54) COVER FOR ILLUMINANT AND LAMP WITH COVER

(71) Applicant: BJB GmbH & Co. KG, Arnsberg (DE)

(72) Inventors: Philipp Henrici, Arnsberg (DE); Olaf Baumeister, Sundern (DE); Tobias Baecker, Welver-Berwicke (DE)

(73) Assignee: BJB GmbH & Co. KG, Arnsberg (DE)

( * ) Notice: Subject to any disclaimer, the term of this patent is extended or adjusted under 35 U.S.C. 154(b) by 0 days.

(21) Appl. No.: 17/690,365

(22) Filed: Mar. 9, 2022

(30) Foreign Application Priority Data

Mar. 18, 2021 (DE) .......................... 102021106644.1

(51) Int. Cl.
*F21V 23/00* (2015.01)
*F21S 4/28* (2016.01)
*F21V 23/06* (2006.01)
*F21V 5/00* (2018.01)
*F21Y 105/10* (2016.01)
*F21Y 115/10* (2016.01)

(52) U.S. Cl.
CPC .............. *F21V 23/005* (2013.01); *F21S 4/28* (2016.01); *F21V 5/007* (2013.01); *F21V 23/009* (2013.01); *F21V 23/06* (2013.01); *F21Y 2105/10* (2016.08); *F21Y 2115/10* (2016.08)

(58) Field of Classification Search
CPC .......... F21S 4/28; F21V 23/06; F21V 23/001; F21V 23/002; F21V 27/02; F21V 5/007
See application file for complete search history.

(56) References Cited

U.S. PATENT DOCUMENTS

| | | | | |
|---|---|---|---|---|
| 8,545,049 B2* | 10/2013 | Davis | ...................... | B29C 65/48 |
| | | | | 362/249.02 |
| 8,858,024 B2* | 10/2014 | Wu | .......................... | F21K 9/60 |
| | | | | 362/240 |
| 9,404,647 B2* | 8/2016 | Duckworth | ............. | F21V 25/12 |
| 10,119,662 B2* | 11/2018 | Wilcox | ................... | F21V 5/007 |
| 11,118,758 B1* | 9/2021 | Greenspan | ............. | F21V 5/045 |
| 2008/0273327 A1* | 11/2008 | Wilcox | ................... | F21V 5/007 |
| | | | | 362/311.06 |
| 2010/0128489 A1* | 5/2010 | Holder | .................... | F21S 8/086 |
| | | | | 362/337 |
| 2012/0188766 A1 | 7/2012 | Lu et al. | | |

(Continued)

FOREIGN PATENT DOCUMENTS

CH             710916 A1    9/2016
DE      202015009551 U1    5/2018

(Continued)

*Primary Examiner* — William N Harris
(74) *Attorney, Agent, or Firm* — Von Rohrscheidt Patents

(57) ABSTRACT

A cover for a circuit board including LED illuminants and at least one connection terminals for connection cables on a top side of the circuit board, the cover including a receiving chamber for the circuit board; a light entry side oriented towards the receiving chamber; a light exit side arranged opposite to the light entry side; fasteners configured to arrange the cover at a light influencing component; optical elements arranged above the LED illuminants and configured to emit light emitted by the LED illuminants, wherein the cover forms a cutout for at least the one connection terminal between two of the optical elements that are adjacent to each other, and wherein the cutout is framed by the cover.

7 Claims, 5 Drawing Sheets

(56) References Cited

U.S. PATENT DOCUMENTS

| | | | |
|---|---|---|---|
| 2013/0176728 A1* | 7/2013 | Bizzotto | ............... F21V 5/007 362/244 |
| 2016/0003454 A1 | 1/2016 | Ye | |
| 2016/0215955 A1 | 7/2016 | Donato et al. | |
| 2017/0114993 A1* | 4/2017 | Kim | .................. F21K 9/20 |

FOREIGN PATENT DOCUMENTS

| | | |
|---|---|---|
| DE | 202019106117 U1 | 2/2020 |
| JP | 5615789 B2 | 10/2014 |

* cited by examiner

COVER FOR ILLUMINANT AND LAMP WITH COVER

RELATED APPLICATIONS

This application claims priority from and incorporates by reference German Patent Application DE 10 2021 106 644.1 filed on Mar. 18, 2021.

FIELD OF THE INVENTION

The invention relates to a cover for a circuit board including LED illuminants and connection terminals for connection cables on a top side of the circuit board.

BACKGROUND OF THE INVENTION

Generic covers are known in the art in many shapes and are disclosed e.g; in DE 20 2019 106 117 U1 by applicant.

A use of LEDs as illuminants in lamps typically requires covers in order to adapt radiation properties of the LEDs to a respective application through optical elements. Additionally, the covers are typically used to close the lamp in a light exit direction and in order to make it esthetically appealing.

Increasing efficiency in lamp fabrication is paramount, in particular simplification of lamp assembly, wherein the new design options provided by a utilization of LED illuminants changes basic principles of lamp assembly.

DE 20 2019 106 117 U1 by applicant proposes to fix the circuit board placed on the lamp component using the cover so that separate fasteners that connect the lamp component and the circuit board with one another are redundant.

The technique proposed in DE 20 2019 106 117 U1 works well in principle but is not easily useable for covers that include additional lamp components on a light exit side, in particular screen elements configured to influence the light, which is typically caused by the constricted installation space and the restricted component visibility during lamp assembly.

BRIEF SUMMARY OF THE INVENTION

Thus, it is an object of the invention to provide a cover which helps with simplifying and improving lamp assembly.

The object is achieved by a cover for a circuit board including LED illuminants and at least one connection terminals for connection cables on a top side of the circuit board, the cover including a receiving chamber for the circuit board; a light entry side oriented towards the receiving chamber; a light exit side arranged opposite to the light entry side; fasteners configured to arrange the cover at a light influencing component; optical elements arranged above the LED illuminants and configured to emit light emitted by the LED illuminants, wherein the cover forms a cutout for at least the one connection terminal between two of the optical elements that are adjacent to each other, and wherein the cutout is framed by the cover.

The cover described supra facilitates for the first time to attach the circuit board with the LED illuminants at the lamp component by applying the cover to the lamp component, in particular when the fasteners are configured as interlocking devices that reach behind the lamp component. Due to the recesses for the connection terminals in the cover wiring the circuit board can be performed after applying the cover and thus after fixing the circuit board since the connection terminals are accessible through the recesses of the cover.

Providing the recesses with a circumferential frame makes the cover stable and fracture resistant.

Advantageously the cover includes arrangement devices and arrangement surfaces for at least one light influencing component on a light exit side of the cover, in particular a grid component in order to provide the cover for assembling lamps which require components to be arranged downstream of the cover in the light exit direction, wherein the components are then advantageously fixed on the cover and retained by the cover.

Components arranged downstream of the cover in the light exit direction are e.g. reflectors or shielding elements assembled from individual segments. The segments with respect to number and arrangement correspond to the optical elements of the cover and form an opening on the light entry side wherein light that exits the optical element can enter through the opening. The segments expand typically in a funnel shape in the light exit direction, wherein the inner surfaces of the funnel shaped segments influence the light exit from the lamp. These lamp elements designated as grid components or interlocking elements optically configure the lamp in addition to influencing the light and are typically used in commercial spaces in line or surface lamps.

An advantageous embodiment is characterized in that the cover includes at least one support for a connection cable on a light exit side wherein the cover is arranged in particular outside of the arrangement surfaces for the light influencing component, in particular when the cable support includes two support arms forming a receiving gap between each other.

The cable support formed by the cover provides a defined, orderly and positionally correct arrangement of the connection cables outside of areas that influence the light like e.g. the optical elements. This way a detrimental shadow cast by the cables is prevented. In particular it is possible due to the orderly and defined position of the connection cables that are received in the cable supports to keep the arrangement devices and arrangement surfaces for additional light influencing components like interlocking elements free from the cables which simplifies assembly of the light influencing components considerably.

In order to reliably fix the circuit board at a lamp component by the cover, it is provided that the cover includes two support legs that laterally define the receiving cavity of the receiving chamber,
the cover includes a cover wall that defines the receiving chamber towards the top side,
the cover wall forms the optical elements and is configure to be placed onto the circuit board.

Additionally, it is provided in a particularly advantageous embodiment that the support legs include fasteners configured as interlocking elements on a bottom side that is oriented against light exit direction, and support at least one cable support on a top side that is oriented in the light exit direction.

The object is also achieved by a lamp including a lamp housing forming a U-shaped illuminant receiver wherein a circuit board including at least one LED illuminant is supported on a base of the illuminant receiver and wherein legs of the illuminant receiver extend in a light exit direction of the LED illuminant; the cover described supra, that extends over the circuit board wherein attachment devices of the cover fix the circuit board on the base; the light influencing component which is supported on the cover and arranged between legs of the illuminant receiver.

BRIEF DESCRIPTION OF THE DRAWINGS

The invention is subsequently described in more detail based on an advantageous embodiments with reference to drawing figures, wherein.

DETAILED DESCRIPTION OF THE INVENTION

Figure 1:
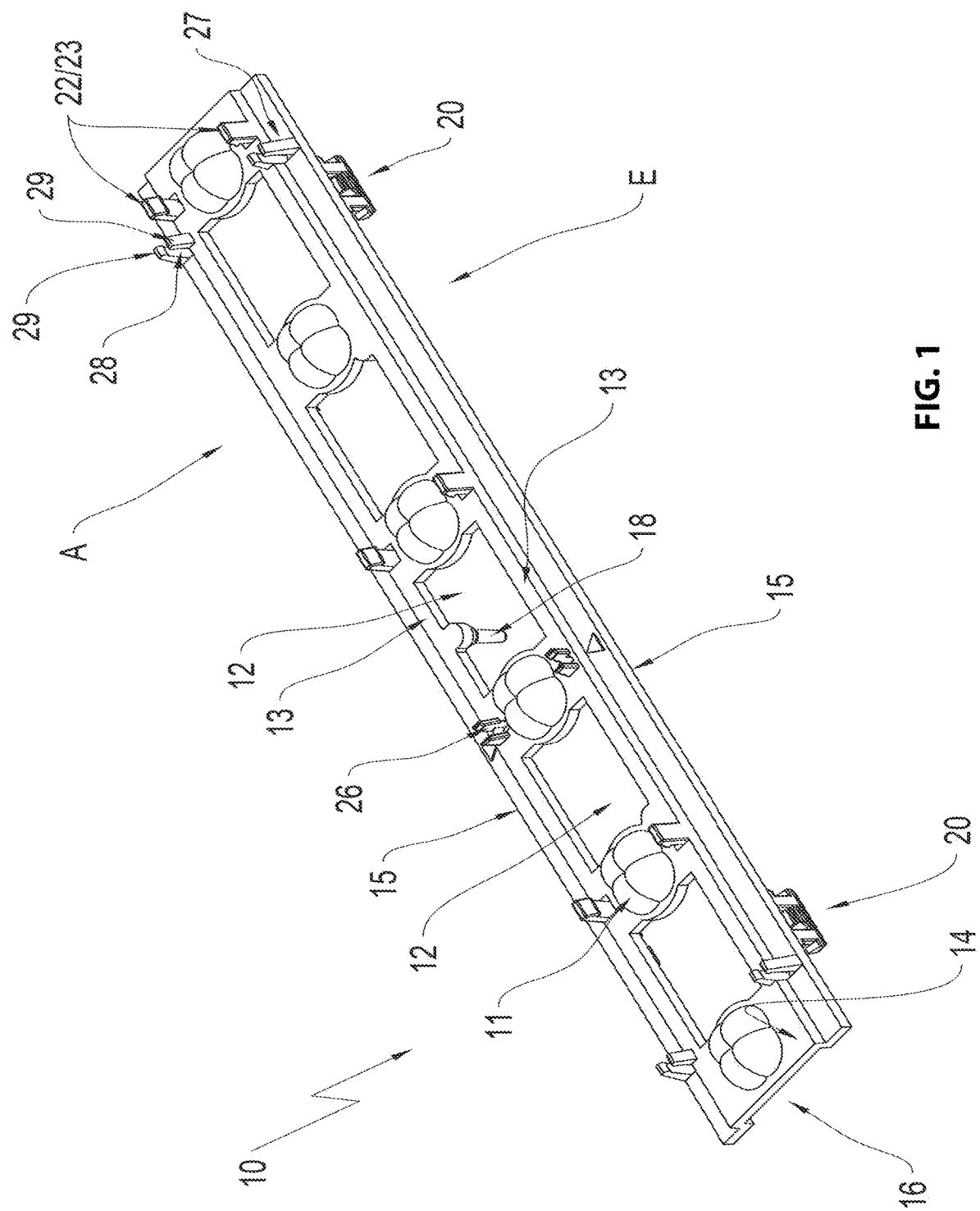
FIG. 1 illustrates a cover according to the invention in a perspective view of a light exit side.
Figure 2:
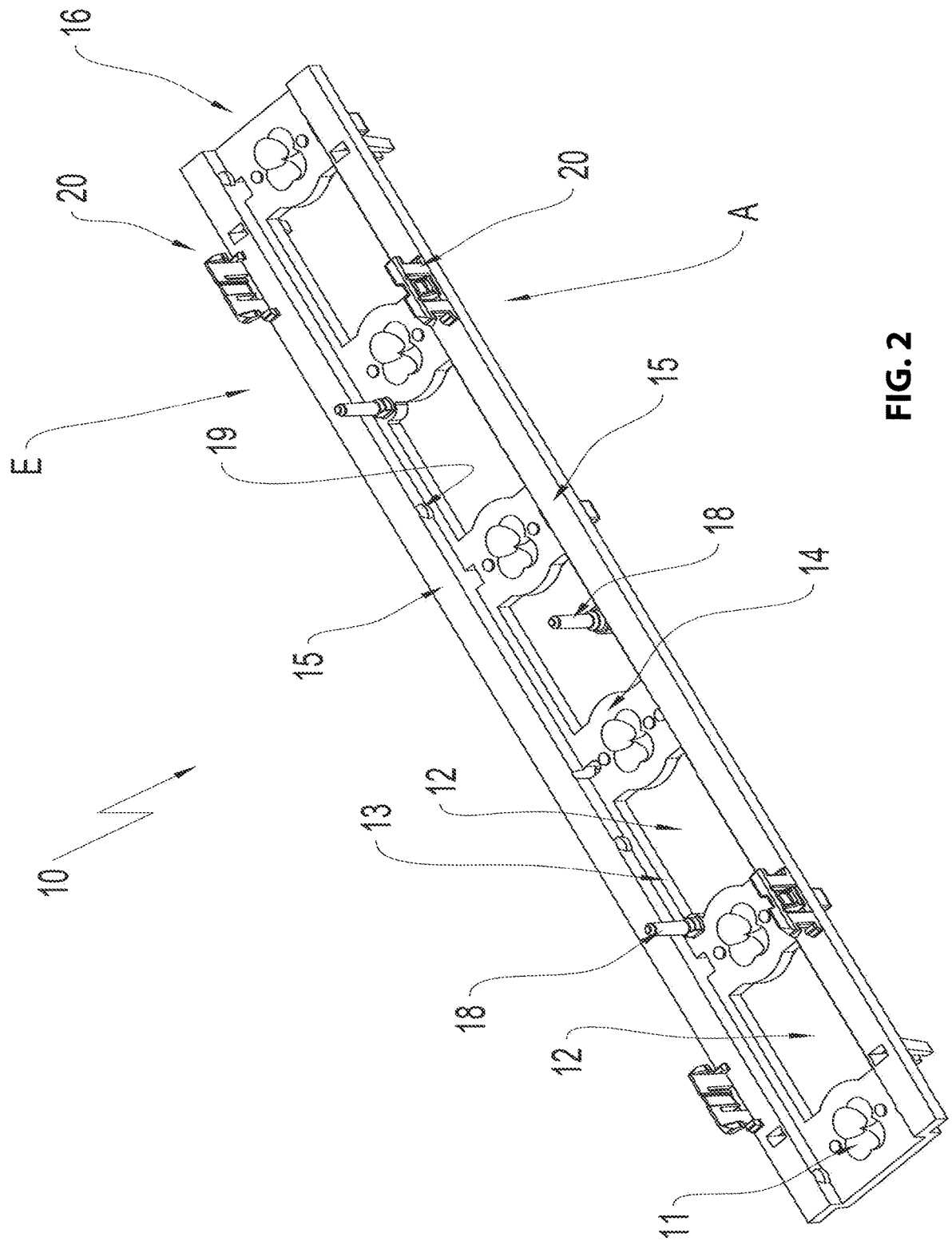
FIG. 2 illustrates the cover according to FIG. 1 in a perspective view of the light entry side.

The drawing figures show a cover according to the invention overall designated with reference numeral 10. The cover 10 is shown in FIGS. 1 and 2 in a perspective view. FIG. 1 shows a perspective view of the light exit side A of the cover 10. FIG. 2 shows a perspective view of the light entry side E of the cover 10. The light exit side A can also be designated as the top side of the cover 10, the light entry side E can be designated as the bottom side of the cover 10.

The cover 10 includes a plurality of optical elements 11 that are arranged one behind another in a row, wherein cutouts 12 are formed between the optical elements 11. The cutouts 12 are cut outs in the cover 10 which are framed by two adjacent optical elements 11 and two opposite legs 13. The optical elements 11 are formed by a cover wall 14 of the cover 10 that respectively supports a support leg 15 at opposite longitudinal sides. The arrangement plane of the support arms 15 is offset relative to the arrangement plane of the cover wall 14 so that the cover wall 14 forms a receiving chamber in combination with the lateral support legs 15, wherein a circuit board 17 can be inserted into a receiving cavity of the receiving chamber 16. The receiving chamber 16 is arranged on a light entry side E of the cover 10. Positioning pins 18 are arranged on the light entry side E in an area of the receiving chamber 16, wherein the positioning pins 18 engage positioning openings of the circuit board 17 and of a lamp component so that the lamp component, the conductor plate 17 and the cover 10 are positioned relative to each other correctly.

The support arms 15 include clamping lugs 19 that are oriented parallel to the bottom side and that protrude into the receiving chamber 16, wherein the clamping lugs 19 are configured to contact the edges of the circuit board 17. Last not least each support leg 15 includes interlocking elements 20 that are configured to fix the cover 10 at a lamp component 21 as described infra.

The cover 10 includes arrangement devices 22 configured as interlocking lugs 23 on the light exit side A and configured to attach a light influencing component 24 configured as a grid element 25 at the cover 10. Positioning arms 26 are arranged on the light exit side A of the cover 10 wherein the positioning arms are configured to align the grid element 25 in a correct position relative to the optical elements 11 of the cover 10. Last not least the cover 10 includes supports 27 for connection cables on the light exit side A on the support legs 15 wherein the supports are provided by supports arms 29 that form a receiving gap 28 between each other.

Figure 3:
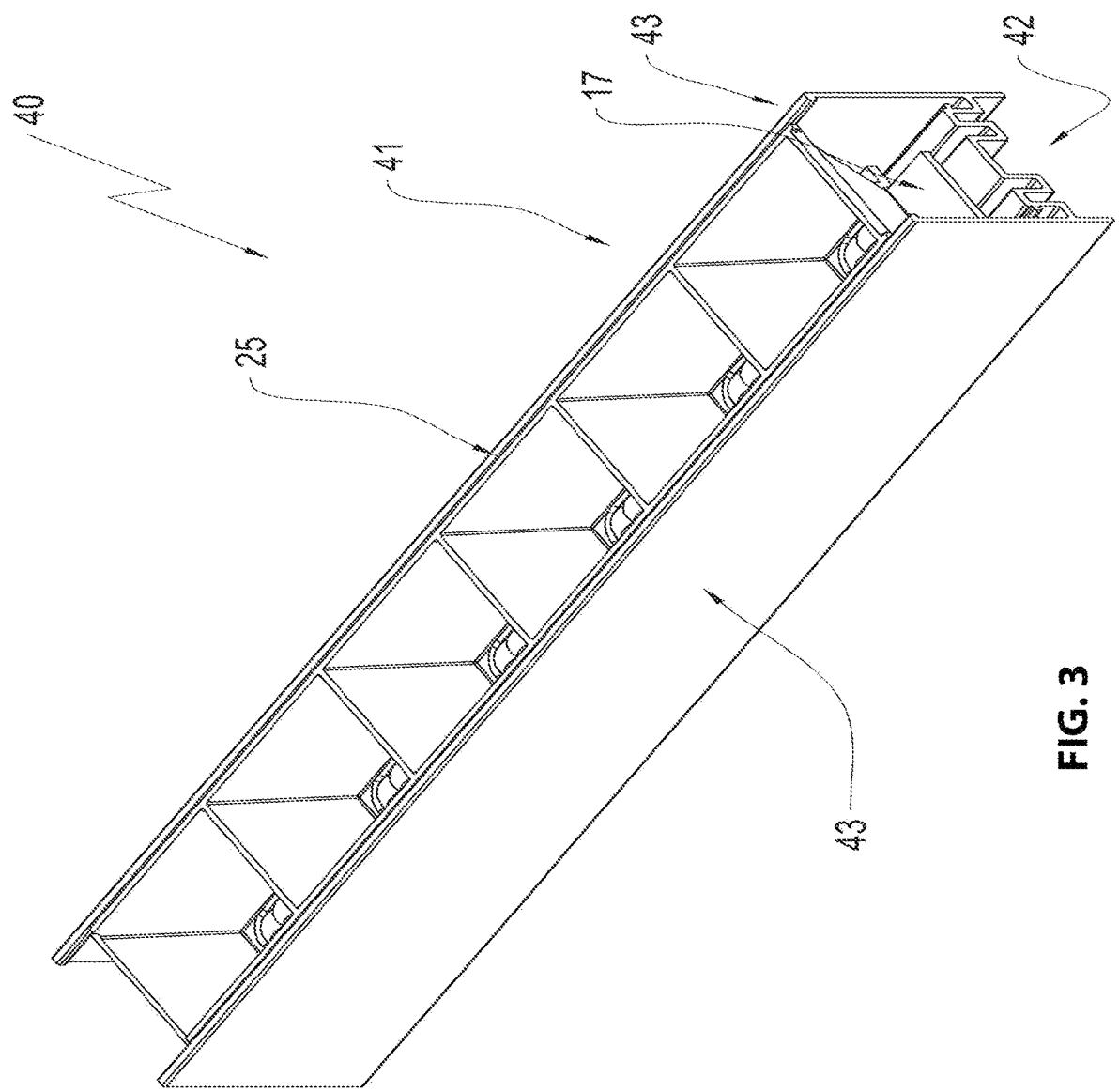
FIG. 3 illustrates a lamp according to the invention.
Figure 4:
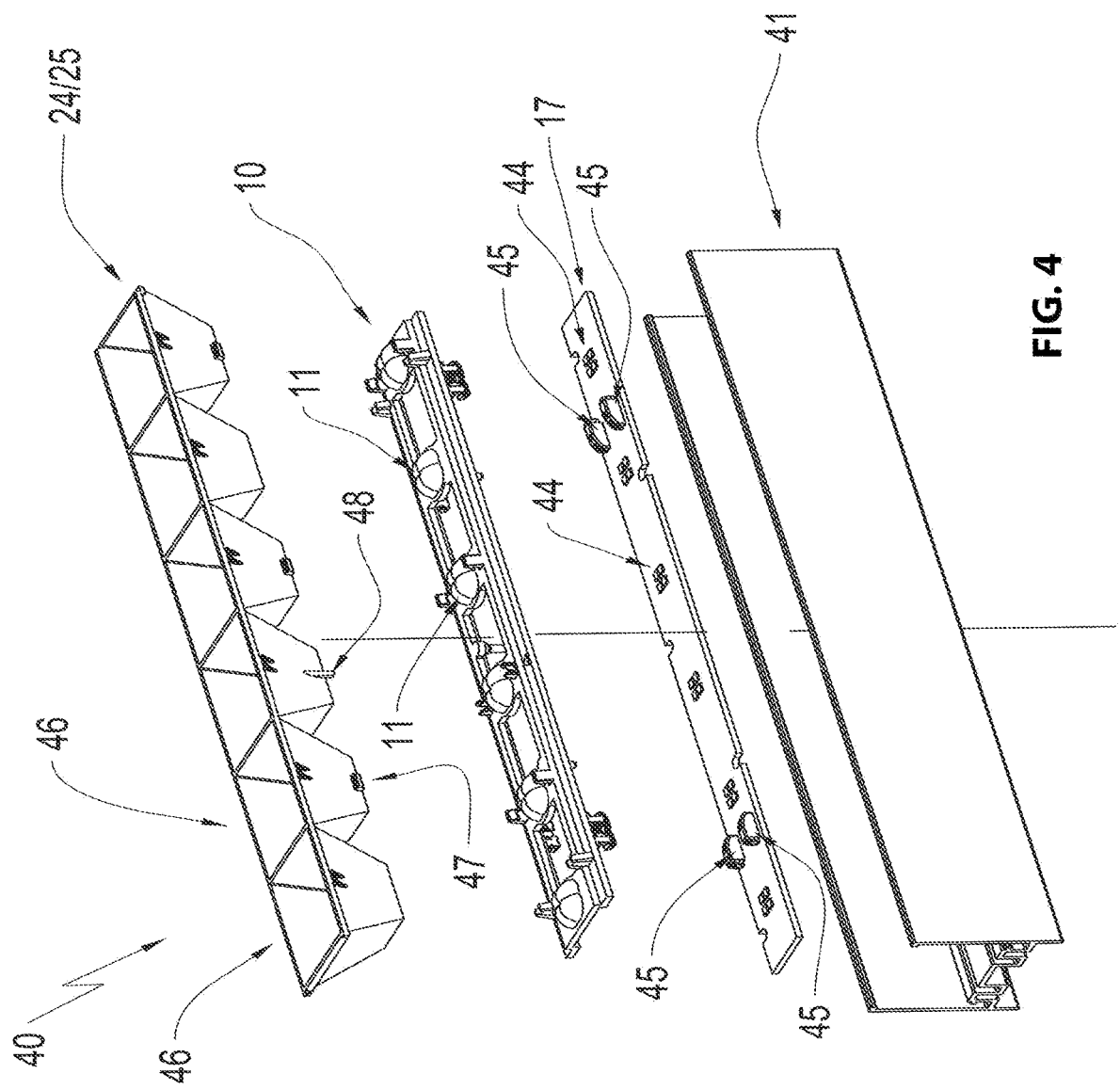
FIG. 4 illustrates the lamp according to FIG. 3 in an exploded view.

FIG. 3 shows a lamp 40 according to the invention in an assembled condition. FIG. 4 shows the lamp 40 according to FIG. 3 in an exploded view. The lamp 40 includes a lamp housing 41 which is configured approximately U-shaped. A housing base 42 includes two housing arms 43 that are arranged in light exit direction wherein the housing arms receive the circuit board 17, the cover 10 and the grid elements 25 between each other.

The exploded view according to FIG. 4 shows that individual LED illuminants 44 are arranged on the circuit board in a row behind one another and offset from each other wherein connection terminals 45 are arranged on the circuit board in intermediary spaces between adjacent LED illuminants 44. The connection terminals 45 supply voltage on the one hand side, however can also be used for connecting control conductors on the other hand side.

The grid element 25 includes individual segments 46 which correspond with respect to number and arrangement to the LED illuminants 44 or the optical elements 11 extending over the LED illuminants 44. The segments 46 thus include a light entry opening which respectively receives an associated optical element. The individual segments 46 are expanded funnel shaped in a light exit direction. Each segment 46 can be provided with a reflecting inner surface and thus functions as a reflector. However, it is also possible to use the segments as screen elements without reflective properties.

Some of the segments 46 support interlocking protrusions 47, wherein interlocking lugs 23 on a cover side reach behind the interlocking protrusions 47 and fix the grid element 25 on the cover 10. Positioning legs 48 cooperate with the positioning arms 26 at the cover in order to provide a positionally correct association of the individual segments 46 of the grid element 25 with the respective optical elements 11 of the cover 10.

Figure 5:
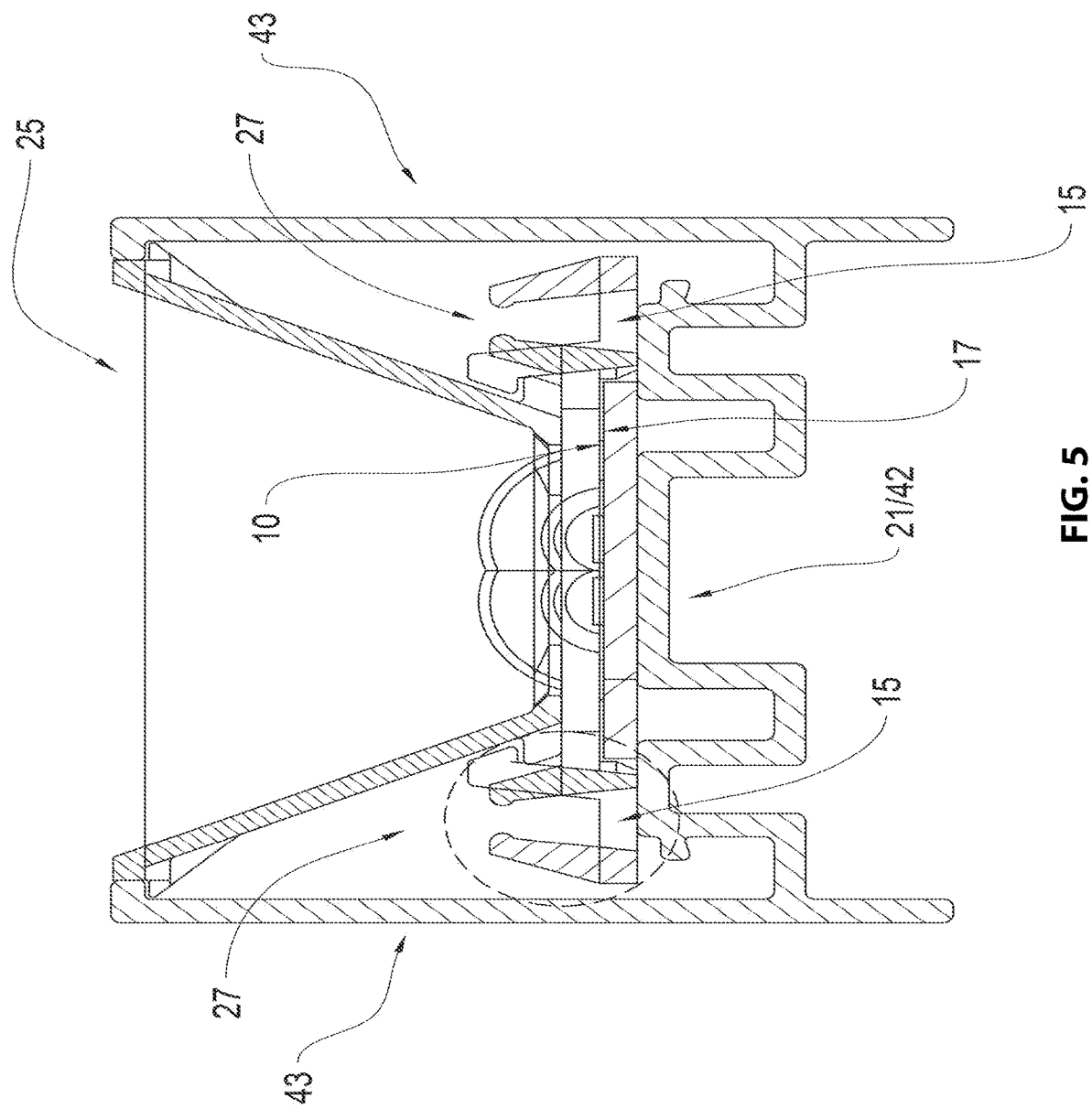
FIG. 5 illustrates a cross sectional view of the lamp according to FIG. 3.

FIG. 5 gives a cross sectional view of the lamp 40 that shows how the individual components cooperate with one another. The housing base 42 which is also designated as a lamp component configured to attach the cover 10 by its interlocking elements 20, primarily provides a support for the circuit board 17. Additionally, the cover 10 is arranged on the housing base 42 so that only the support legs 15 of the cover 10 contact the housing base 42. The receiving chamber formed by the support legs 15 and the cover wall 14 illustrated in FIG. 5 receives the circuit board 17. Interlocking the cover 10 at the housing base 42 fixes the circuit board 17 in the lamp housing.

After connecting the connection cables at the connection terminals 45 the grid element 25 is inserted into the lamp housing 41 so that an edge distal from the cover contacts the free ends of the housing legs 43 and interlocks therein. The cable support 27 of the cover 10 is arranged laterally from the receiving openings of the segments 46 and outside of the interior that expands in a funnel shape so that cables inserted and supported therein are arranged outside of arrangement surfaces and out outside of areas occupied by arrangement surfaces and arrangement devices 22 or interlocking lugs 23 formed by the cover.

Thus, it is an essential advantage of the invention that the circuit board can be fixed by the cover 10 at the housing base 42 of the lamp 40 without having to use separate attachment devices for the circuit board 17. After fixing the circuit board 17 at the housing base 42 the connection and/or control conductors are connected at the terminal clamps 45 and supported by the inventive supports 27 in a defined portion of the cover 10, namely above the support legs 15. Thus, the grid element 25 can be inserted in a simple manner without colliding with the connection and/or control conductors into the space between the housing legs 43 and can be interlocked there as well as at the cover 10.

Thus, the cover 10 substantially simplifies assembly of the lamp 40 in that it supports the circuit board 17 and routes the required control and/or connection conductors in an area that is not essential for mounting the grid element 25.

REFERENCE NUMERALS AND DESIGNATIONS 10 cover
11 optical element
12 cutout
13 leg
14 cover wall
15 support leg
16 receiving chamber
17 circuit board
18 positioning pin
19 clamping lug
20 interlocking element
21 lamp component
22 arrangement device
23 interlocking lug
24 light influencing component
25 grid element
26 positioning arm
27 support for connection cable
28 receiving gap
29 support arm
40 lamp
41 lamp housing
42 housing base
43 housing cover
44 LED illuminant
45 connection terminal
46 segment
47 interlocking protrusion
48 positioning leg
A light exit side
E light entry side

What is claimed is:

1. A cover for a circuit board including LED illuminants and at least one connection terminals for connection cables on a top side of the circuit board, the cover comprising:
   a receiving chamber for the circuit board;
   a light entry side oriented towards the receiving chamber;
   a light exit side arranged opposite to the light entry side;
   fasteners configured to arrange the cover at a light influencing component;
   optical elements arranged above the LED illuminants and configured to emit light emitted by the LED illuminants,
   wherein the cover forms a cutout for at least the one connection terminal between two of the optical elements that are adjacent to each other, and
   wherein the cutout is framed by the cover.

2. The cover according to claim 1, further comprising: arrangement surfaces for at least one light influencing component or at least one grid element on a light exit side of the cover.

3. The cover according to claim 2, further comprising at least one support for a connection cable on the light exit side of the cover, wherein the at least one support is arranged outside of arrangement surfaces for the light influencing component.

4. The cover according to claim 3, wherein the at least one support for the connection cable includes two support arms forming a receiving gap between one another.

5. The cover according to claim 3, further comprising:
   two support legs that laterally define the receiving cavity of the receiving chamber;
   a cover wall that defines a top side of the receiving chamber,
   wherein the cover wall forms optical elements and is configured to be supported on the circuit board.

6. The cover according to claim 5,
   wherein the two support legs include attachment devices configured as interlocking elements at bottom sides that are oriented against the light exit direction, and
   wherein the two support legs respectively include the at least one cable support on a top side oriented in the light exit direction.

7. A lamp, comprising:
   a lamp housing forming a U-shaped illuminant receiver wherein a circuit board including at least one LED illuminant is supported on a base of the illuminant receiver and wherein legs of the illuminant receiver extend in a light exit direction of the LED illuminant;
   the cover according to claim 1, that extends over the circuit board wherein attachment devices of the cover fix the circuit board on the base;
   the light influencing component which is supported on the cover and arranged between legs of the illuminant receiver.

\* \* \* \* \*